United States Patent
Kim

(10) Patent No.: US 9,447,854 B2
(45) Date of Patent: Sep. 20, 2016

(54) FORCE TRANSFER MECHANISM

(76) Inventor: Young Hee Kim, Busan-si (KR)

(*) Notice: Subject to any disclaimer, the term of this patent is extended or adjusted under 35 U.S.C. 154(b) by 504 days.

(21) Appl. No.: 13/819,517

(22) PCT Filed: Aug. 26, 2011

(86) PCT No.: PCT/KR2011/006342
§ 371 (c)(1),
(2), (4) Date: Feb. 27, 2013

(87) PCT Pub. No.: WO2012/026790
PCT Pub. Date: Mar. 1, 2012

(65) Prior Publication Data
US 2013/0152713 A1   Jun. 20, 2013

(30) Foreign Application Priority Data

Aug. 27, 2010  (KR) .................. 10-2010-0083687
Aug. 26, 2011  (KR) .................. 10-2011-0085858

(51) Int. Cl.
*E05C 1/02*     (2006.01)
*F16H 21/44*    (2006.01)
*F16H 25/18*    (2006.01)
(Continued)

(52) U.S. Cl.
CPC ............. *F16H 21/44* (2013.01); *F16F 15/046* (2013.01); *F16H 19/04* (2013.01); *F16H 25/183* (2013.01); *F16F 2232/00* (2013.01); *Y10T 74/18096* (2015.01); *Y10T 74/18992* (2015.01)

(58) Field of Classification Search
CPC ............ Y10T 292/096; Y10T 74/18096; Y10T 74/18992; F16H 21/44; F16H 19/04; F16H 25/183; F16F 15/046; F16F 2232/00

USPC ............ 292/137, 162, 177, 145; 74/30, 110
See application file for complete search history.

(56) References Cited

U.S. PATENT DOCUMENTS 1,338,713 A * 5/1920 Toney ................. E05C 7/06
                                                292/226
2,202,916 A * 6/1940 Mussa ................ E05C 7/06
                                                292/177
(Continued)

FOREIGN PATENT DOCUMENTS

JP       08-218703       8/1996
KR    10-1999-0021744    3/1999
(Continued)

OTHER PUBLICATIONS

International Search Report mailed Mar. 28, 2012 for PCT/KR2011/006342, citing the above reference(s).

*Primary Examiner* — Kristina Fulton
*Assistant Examiner* — Faria Ahmad
(74) *Attorney, Agent, or Firm* — Hauptman Ham, LLP

(57) ABSTRACT

A force transfer mechanism includes cylindrical guide housing; a movable body which is slidably arranged in the guide housing so as to move in a linear direction by means of an externally applied force, and which includes a cutout groove having one or more inclined surfaces, and through-holes formed in a direction perpendicular to the linear motion direction in portions corresponding to the inclined surfaces; and a slave unit, one end of which is coupled to the movable body such that said end passes through the through-holes of the movable body and moves along the inclined surfaces of the cutout groove vertically relative to the movement direction of the movable body, and the other end of which is elastically supported.

14 Claims, 17 Drawing Sheets

(51) Int. Cl.
    *F16H 19/04*     (2006.01)
    *F16F 15/04*     (2006.01)
    *E05C 1/04*     (2006.01)
    *E05C 1/10*     (2006.01)

(56) References Cited

U.S. PATENT DOCUMENTS

| | | | | |
|---|---|---|---|---|
| 3,792,884 | A | * | 2/1974 | Tutikawa .................. E05C 1/06 292/179 |
| 5,123,685 | A | * | 6/1992 | Donovan ................ E05C 17/04 16/82 |
| 5,527,074 | A | * | 6/1996 | Yeh ....................... E05B 65/104 292/177 |
| 7,066,678 | B2 | * | 6/2006 | Huang .................. F16B 7/0406 292/150 |
| 7,267,379 | B2 | * | 9/2007 | Rusiana ................ E05B 15/101 292/137 |
| 2015/0042106 | A1 | * | 2/2015 | Kim .......................... E05C 1/12 292/137 |

FOREIGN PATENT DOCUMENTS

| | | |
|---|---|---|
| KR | 10-1999-0050119 | 7/1999 |
| KR | 20-0160871 | 11/1999 |
| KR | 10-2000-0074623 | 12/2000 |

\* cited by examiner

FORCE TRANSFER MECHANISM

CROSS REFERENCE TO RELATED APPLICATION

This application claims the priority of Korean Patent Application No. 10-2010-00083687, filed on Aug. 27, 2010 and Korean Patent Application No. 10-2011-0085858, filed on Aug. 26, 2011 in the KIPO (Korean Intellectual Property Office). Further, this application is the National Phase application of International Application No. PCT/KR2011/006342 filed Aug. 26, 2011, which designates the United States and was published in Korean.

TECHNICAL FIELD

The present invention relates generally to a force transfer mechanism and, more particularly, to a force transfer mechanism for converting a linear reciprocating motion caused by a force applied to one direction and its opposite direction into another linear reciprocating motion in a new direction perpendicular to the direction of the applied force.

BACKGROUND ART

Normally a force transfer mechanism, also referred to as a power transmission mechanism, uses a cam, a crank, a gear, or the like in order to convert the direction of force.

A cam type is to convert a rotary motion into a linear reciprocating motion. A crank type is to convert a linear reciprocating motion into a rotary motion. A gear type is to convert a rotary motion into another rotary motion.

Unfortunately, such a conventional force transfer type fails to convert a linear reciprocating motion into another linear reciprocating motion in a perpendicular direction. Even though this may be realized by a combination of such types, it requires a complicated structure.

DETAILED DESCRIPTION OF THE INVENTION

Technical Problems

Accordingly, the present invention is to solve the aforesaid problems and disadvantages. An object of this invention is to provide a force transfer mechanism that converts a linear reciprocating motion in a given direction into another linear reciprocating motion in a new direction perpendicular to the given direction through a simpler and smaller structure in comparison with conventional mechanisms of cam, crank, and gear types.

Technical Solutions

In order to accomplish the above object, the present invention provides a force transfer mechanism that comprises a guide housing having a container shape; a movable body arranged slidably in the guide housing, moving in a linear direction by means of an externally applied force, including a cutout groove having one or more inclined surfaces, and including a through-hole formed in a direction perpendicular to the linear moving direction at a part corresponding to the inclined surfaces; and a slave unit including a first end coupled to the movable body such that the first end passes through the through-hole of the movable body and moves along the inclined surfaces in the direction perpendicular to the linear moving direction of the movable body, further including a second end elastically supported to the guide housing, and moving in the direction perpendicular to the linear moving direction of the movable body by interlocking with a linear motion of the movable body.

The movable body and the slave unit are returned to original positions when the force externally applied to the movable body is removed.

The slave unit may include a shaft passing through both the movable body and the guide housing and installed movably; a slider linked to one end of the shaft, moving in an axis direction of the shaft and keeping contact with the inclined surface of the cutout groove during the linear motion of the movable body, and thereby driving the shaft in the direction perpendicular to the linear moving direction of the movable body; and an elastic member elastically supporting the other end of the shaft, and providing an elastic force for returning the movable body and the slave unit to original positions when the force externally applied to the movable body is removed.

The through-hole of the movable body may have a cross section of an elongated oval form or a rectangular form, a width greater than the diameter of a shaft, and a length greater over twice than the displacement of the shaft.

Preferably, the one or more inclined surfaces are formed of a single inclined surface or a pair of inclined surfaces which meet each other to form an angle. In this case, the pair of inclined surfaces may form V-shaped concavity or reverse V-shaped convexity. Also, it is desirable that the angle formed by the single inclined surface is set to the range of 15 to 75 degrees and the angle formed by the pair of inclined surfaces is set to the range of 30 to 160 degrees.

Additionally, a plurality of cutout grooves may be formed continuously to form a plurality of upper ends and lower ends in a lengthwise direction of the movable body. A plurality of inclined surfaces which form the plurality of cutout grooves may have the same slope angle between confronting inclined surfaces or different slope angles and different lengths between confronting inclined surfaces.

In which case, the force transfer mechanism may further comprise a plurality of slave units each of which corresponds to each cutout groove of the movable body, interlocks with the linear motion of the movable body, and thereby moves in a direction perpendicular to the linear motion of the movable body.

Preferably, the slider may have an arc-shaped part that keeps contact with the inclined surface. Also, the slider may be removably linked to the shaft by means of a nut. And also, the slider may further have a ball bearing formed on a part that keeps contact with the inclined surface, and a guide groove may be formed along the inclined surface being contact with the ball bearing.

The elastic member may be formed of a coil spring which is extended along and rolled on the shaft. In this case, the elastic member is fixedly supported, at one end thereof, to the shaft and also fixedly supported, at the other end thereof, to the guide housing, so that the elastic member can return the shaft to its original position in response to removal of force externally applied to the movable body.

The force transfer mechanism of this invention may further comprise a case fixed to one side of the guide housing to cover the elastic member; and a spring locking pin inserted into pin holes formed on the case. The spring locking pin may be inserted into a selected one of the pin holes in order to change a contracting length of the elastic member and thereby to adjust an elastic force of the elastic member.

The displacement of the shaft is in inverse proportion to an angle between the inclined surfaces. And the shaft may be used to drive a latch of a door lock.

The force transfer mechanism of this invention may further comprise a pinion installed on at least one side of the movable body, being adjacent to a direction of the through-hole; and a rack installed on the inside of the guide housing and moving by being engaged with the pinion.

In the force transfer mechanism of this invention, the movable body may have m×n (m and n are natural numbers) through-holes in a moving direction thereof, and the slave unit may be arranged in each through-hole.

Furthermore, the present invention provides a force transfer mechanism that comprises a guide housing; a movable body arranged movably in the guide housing, moving in a direction of an externally applied force, including a cutout groove having at least one inclined surface, and including a through-hole formed in a direction perpendicular to the force direction at a part corresponding to the inclined surface; and a slave unit including a first end coupled to the movable body such that the first end passes through the through-hole of the movable body and moves along the inclined surface in the direction perpendicular to a moving direction of the movable body, further including a second end elastically supported to the guide housing, and moving in the direction perpendicular to the moving direction of the movable body by interlocking with a motion of the movable body.

Advantageous Effects

In the present invention as mentioned above, a single, a pair of, or continuous several pairs of inclined surfaces are formed on the movable body. A linear reciprocating motion of the movable body can be converted into another linear reciprocating motion of the shaft in a perpendicular direction through the slider which moves in an axial direction of the shaft on the inclined surfaces. In this case, the present invention can keep a simpler structure, allow a compact manufacture, and accomplish an easy manufacture and maintenance.

Also, the present invention may be used for driving a variety of mechanisms, e.g., a latch of a door lock, for converting a linear reciprocating motion into another linear reciprocating motion in a perpendicular direction.

And also, the present invention may easily change the magnitude of force transferred from the movable body to the shaft by adjusting the elastic force of the elastic member.

MODE FOR CARRYING OUT THE INVENTION

Hereinafter, embodiments of the present invention will be described in detail with reference to the accompanying drawings.

Figure 1:
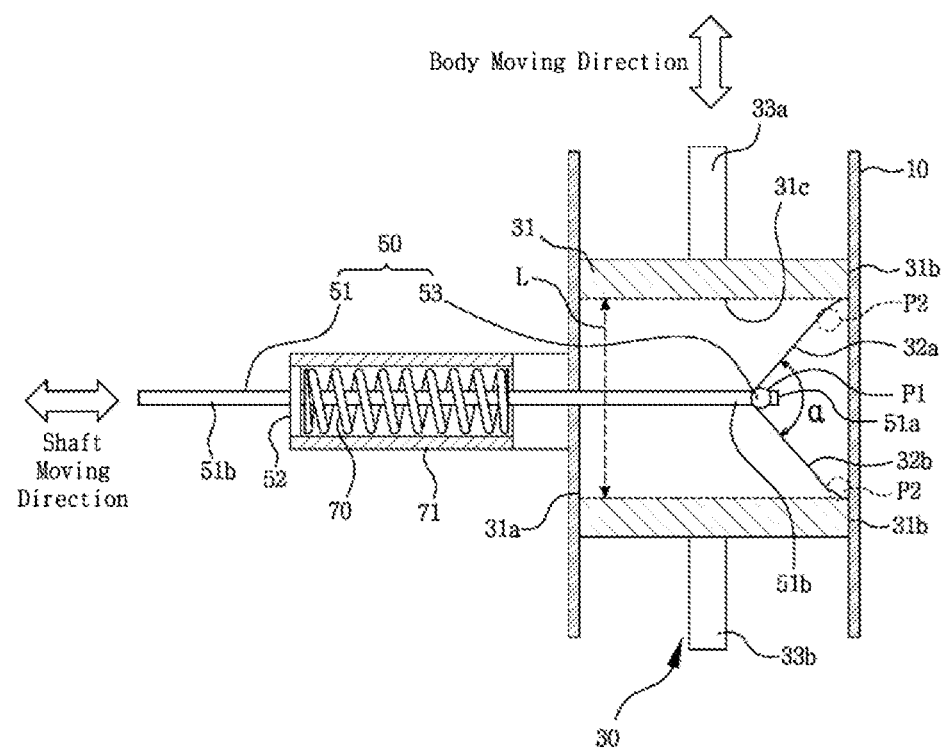
FIG. 1 is a schematic view illustrating a force transfer mechanism in accordance with the first embodiment of the present invention.

Referring to FIG. 1, a force transfer mechanism in the first embodiment of the present invention includes a guide housing 10, a movable unit 30, a slave unit 50, and en elastic member 70.

The guide housing 10 has a length enough for a linear reciprocating sliding of the movable unit 30 located therein. In this case, the guide housing 10 has the shape of a container with both open ends.

Figure 2:
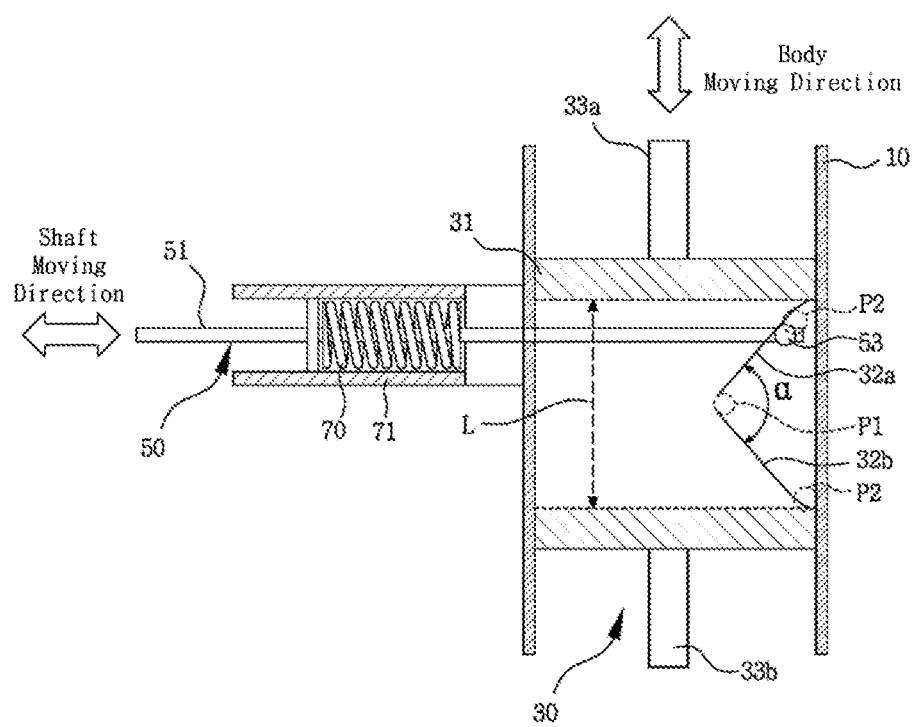
FIG. 2 is a schematic view illustrating a state in which a force is applied to a movable unit of the force transfer mechanism shown in FIG. 1.
Figure 3:
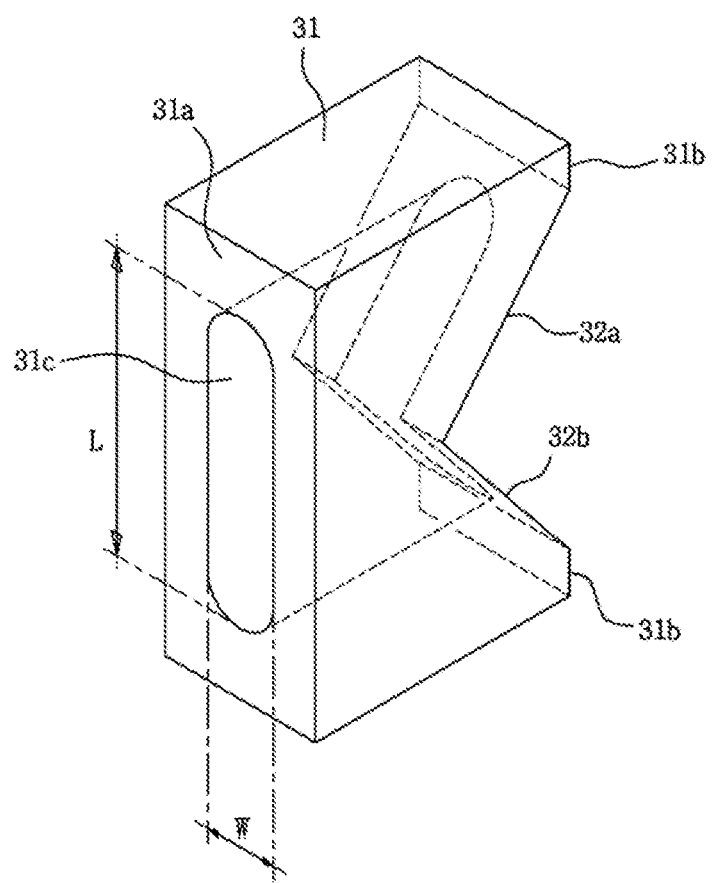
FIG. 3 is a perspective view illustrating a movable body shown in FIG.
Figure 4:
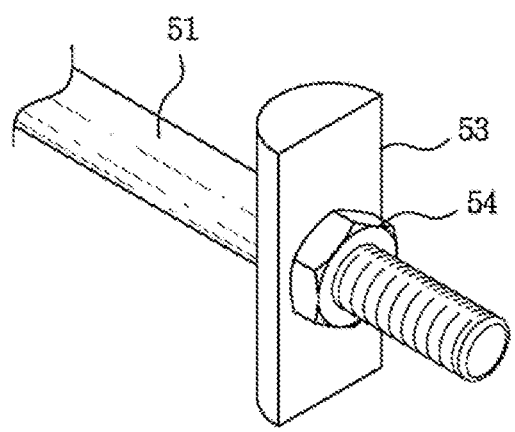
FIG. 4 is a perspective view illustrating the shape of a slider shown in FIG. 1 and a preferred example of the linkage between the slider and a shaft.

Preferably, the shape of the guide housing 10 corresponds to that of a movable body 31 of the movable unit 30. For example, if a cross section of the movable body 31 is one of a circular form, an oval form, and a polygonal form, the guide housing 10 has the same cross section as the movable body 31 has. As shown in FIGS. 1 to 3, the guide housing 10 and the movable body 31 have preferably a circular or rectangular form in cross section.

Alternatively, the guide housing 10 may be composed of a pair of plates (not shown) which are arranged at intervals and in parallel, depending on the structure of various apparatuses which utilize the force transfer mechanism of this embodiment. Namely, if allowing a linear reciprocating motion of the movable unit 30 within a given distance, the guide housing 10 is not limited to a specific shape.

The movable unit 30 includes the movable body 31 and a pair of handles 33a and 33b, and is movably installed in the guide housing 10. If the guide housing 10 is a rectangular cylinder, the movable body 31 has four outer sides which face respectively four inner sides of the guide housing 10. Among them disposed in two directions perpendicular to a moving direction of the movable body 31, at least a front side 31a and a rear side 31b, disposed in a direction of the slave unit 50, of the movable body 31 are in slidable contact with the inner sides of the guide housing 10.

Additionally, the movable body 31 has a pair of inclined surfaces 32a and 32b which are inwardly sloped from the rear side 31b and meet each other to form a cutout groove. This pair of inclined surfaces 32a and 32b is formed of a flat or curved surface such that a slider 53 of the slave unit 50 can be moved in an axial direction of a shaft 51.

Preferably, an angle (α) between the inclined surfaces 32a and 32b is set to the range of 30 to 160 degrees. As this angle (α) between the inclined surfaces 32a and 32b becomes smaller, the displacement of the shaft 51 becomes greater even though a reciprocating distance of the movable body 31 is small. Therefore, compared to case of a great angle (α) between the inclined surfaces 32a and 32b, a small angle can reduce the length of the guide housing 10 and thus realize a compact size of the force transfer mechanism.

Additionally, as an angle (α) between the inclined surfaces 32a and 32b becomes smaller, the magnitude of an external force applied to the movable unit 30 should be increased in inverse proportion to this angle (α).

Meanwhile, regardless of an angle (α) between the inclined surfaces 32a and 32b of the movable body 31, a pushing or pulling force of the shaft 51 can be varied by adjusting an elastic force of the elastic member 70. Therefore, by combining an elastic force (or coefficient of elasticity) of the elastic member 70 with an angle (α) between the inclined surfaces 32a and 32b, the displacement and the pushing or pulling force of the shaft 51 can be regulated.

Further, as shown in FIG. 3, the movable body 31 has a through-hole 31c, which is formed from the front side 31a to the rear side 31b in a direction perpendicular to a linear reciprocating direction of the movable body 31. This through-hole 31c secures a space through which the shaft 51 can perform a reciprocating motion in a direction perpendicular to a moving direction of the movable body 31 by interlocking with a linear reciprocating motion of the movable body 31.

As further shown in FIG. 3, the through-hole 31c may have a cross section of an elongated oval form or a rectangular form. Preferably, the width (W) is somewhat greater than the diameter of the shaft 51, and the length (L) is greater over twice than the displacement of the shaft 51. The displacement of the shaft 51 is in inverse proportion to an angle (α) between the inclined surfaces 32a and 32b and in proportion to a height from the initial position (P1) to the peak position (P2) of the slider on the inclined surfaces 32a and 32b.

The movable body 31 may be formed of one of board-like material, rod-shaped material, rectangular lumber, pipe, and the like.

The slave unit 50 moves in a direction perpendicular to a moving direction of the movable unit 30 by interlocking with a linear reciprocating motion of the movable unit 30. As a result, the slave unit 50 changes the direction of a force externally applied to the movable unit 30. The slave unit 50 includes the shaft 51, the slider 53, and the elastic member 70.

The shaft 51 penetrates one or both sides of the guide housing 10 and is disposed in the through-hole 31c of the movable body 31. Then the shaft 51 moves in a direction perpendicular to a linear reciprocating direction of the movable body 31. The shaft 51 is linked, at one end 51a thereof, to the slider 53 and is connected, at the other end 51b thereof, to any structure (not shown) or apparatus (not shown) that receives mechanical power of the shaft 51.

Additionally, at the other end 51b of the shaft 51 and along the outer surface of the shaft 51, a supporting flange 52 is fixedly installed to support one end of the elastic member 70. The supporting flange 52 performs a role of restoring the shaft 51 to the original position by means of elasticity of the elastic member 70.

The slider 53 is a medium that receives a force from the movable body 31 and drives the shaft 51. The slider 53 is extended in a direction perpendicular to a lengthwise direction of the movable body 31 and is placed on a single inclined surface (40 in FIG. 10) or on a pair of inclined surfaces 32a and 32b. Preferably, as shown in FIG. 3, the slider 53 has an arc-shaped (e.g., semicircular) cross section and is removably linked to the other end 51b of the shaft 51 by means of a nut 54.

When the movable body 31 moves back and forth in a linear direction along the guide housing 10 by any external force applied to the handles 33a and 33b, the slider 53 moves in an axis direction of the shaft 51 while keeping contact with the single inclined surface 40 or one of the inclined surfaces 32a and 32b.

When there is no force applied to the movable body 31, the slider 53 is located at the initial position (P1) which corresponds to the lowest point of the single inclined surface 40 or between the inclined surfaces 32a and 32b. Then, by any force applied to the movable body 31, the slider 53 moves up to the peak point (P2) corresponding to the highest point of each inclined surface 32a and 32b.

When a force applied to the movable body 31 is removed, the slider 53 moves slidingly along the inclined surface 32a and 32b by means of the elastic force of the elastic member 70 and is ultimately located at the initial position (P1). In this case, while interlocking with the return to the initial position (P1) of the slider 53, both the shaft 51 and the movable body 31 are returned to their original positions, thus performing a reciprocating motion.

The inclined surfaces 32a and 32b of the movable body 31 and the slider 53 are preferably formed of material having higher abrasion resistance and lower friction loss since they are continuously subjected to sliding contact. At least, contact parts between the slider 53 and the single inclined surface 40 or the pair of inclined surfaces 32a and 32b require surface treatment for enhancing abrasion resistance.

The elastic member 70 is installed in a case 71 which is fixed to one side of the guide housing 10, this side allowing the shaft 51 to be protruded therefrom. The elastic member 70 is formed of a coil spring which is extended along and rolled on the shaft 51. The elastic member 70 is fixedly supported, at one end thereof, to the supporting flange 52 of the shaft 51 and also fixedly supported, at the other end thereof, to the inside of the case 71.

Once any external force applied to the movable body 31 through the handle 33a and 33b is removed when the slider 53 is located for instance at the peak position, the elastic member 70 forces the slider 53 to return to the initial position (P1) from the peak position (P2), using an elastic force thereof.

Meanwhile, each component of the force transfer mechanism may be formed of ferrous metal, nonferrous metal, engineering plastic, ceramic, or the like which enhances durability and is selected in consideration of cost and required characteristics.

Now, the operation of the force transfer mechanism in the first embodiment of this invention will be described.

First, when a pushing or pulling force is applied to one of the handles 33a and 33b of the movable unit 30, the movable body 31 moves linearly along the guide housing 10 in a direction of the applied force.

Interlocking with the movement of the movable body 31, the slider 53 of the slave unit 50 moves slidingly along the inclined surface 32a and 32b from the initial position (P1). Namely, the slider 53 becomes distant from the initial position (P1) in an axis direction of the shaft 51.

Therefore, the shaft 51 of the slave unit 50 moves linearly toward the movable body 31, and the elastic member 70 contracts by the supporting flange 52 of the shaft 51 while an elastic force is gradually increased.

Thereafter, if the force applied to one of the handles 33a and 33b or to the single inclined surface (40 in FIG. 10) is removed, the elastic force of the elastic member 70 is applied to the shaft 51 so that the shaft 51 can return to its original position. Namely, the slider 53 located for instance at the peak position (P2) moves to the initial position (P1) in an axis direction of the shaft 52 while keeping contact with the inclined surface 32a or 32b.

In this case, the movable body 31 returns to its original position, depending on the movement of the slider 53 to the initial position P1.

As discussed hereinbefore, the force transfer mechanism in the first embodiment of this invention can perform reliable force transfer and direction conversion through a simple structure composed of the guide housing 10, the movable unit 30, the slave unit 50, and the elastic member 70.

Meanwhile, when an external force applied to the movable body 31 is removed, a force applied to the shaft 51 is determined according to an elastic force of the elastic member 70. Namely, a force applied to the shaft 51 is increased when the elastic member 70 having a higher elastic force (or coefficient of elasticity) is used, and a force applied to the shaft 51 is reduced when the elastic member 70 having a lower elastic force is used.

Therefore, if there is a need to adjust a force applied to the shaft 51, the elastic member 70 is replaced with another one having different elastic force (or coefficient of elasticity). However, this is inconvenient since the replacement of the elastic member 70 having a suitable elastic force (or coefficient of elasticity) is frequently required.

Figure 5:
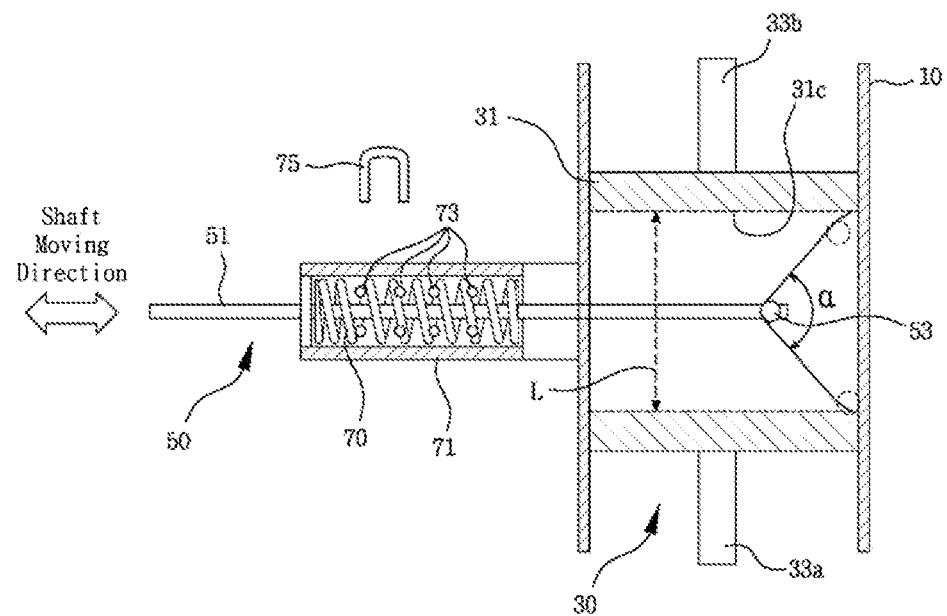
FIG. 5 is a schematic view illustrating an example of a spring locking pin for adjusting the elasticity of a spring.

This problem can be solved by using a locking pin 75 as shown in FIG. 5. The case 71 may have a plurality of pin holes 73 at intervals. By inserting the locking pin 75 into a selected pair of pin holes 73, a contracting length of the elastic member 70 is simply changed. As a result, an elastic force of the elastic member 70 can be easily adjusted.

The force transfer mechanism in accordance with the first embodiment of this invention may be favorably used for a door lock that can open a door by releasing a latch connected to the shaft when a door handle is pushed or pulled.

Figure 6:
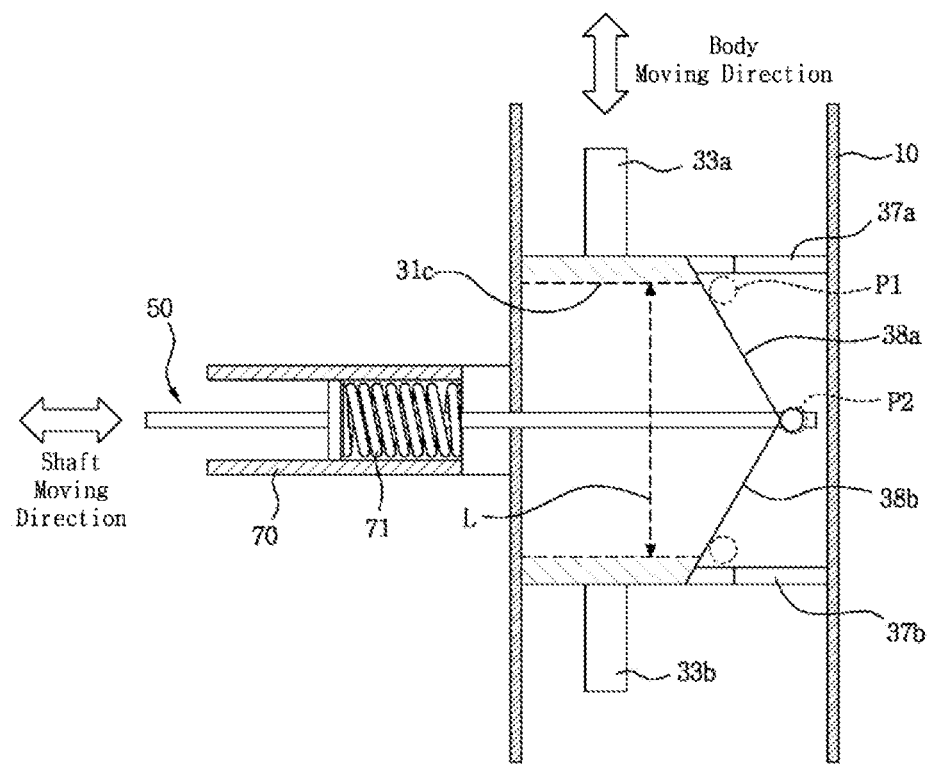
FIG. 6 is a schematic view illustrating a force transfer mechanism in accordance with the second embodiment of the present invention.
Figure 7:
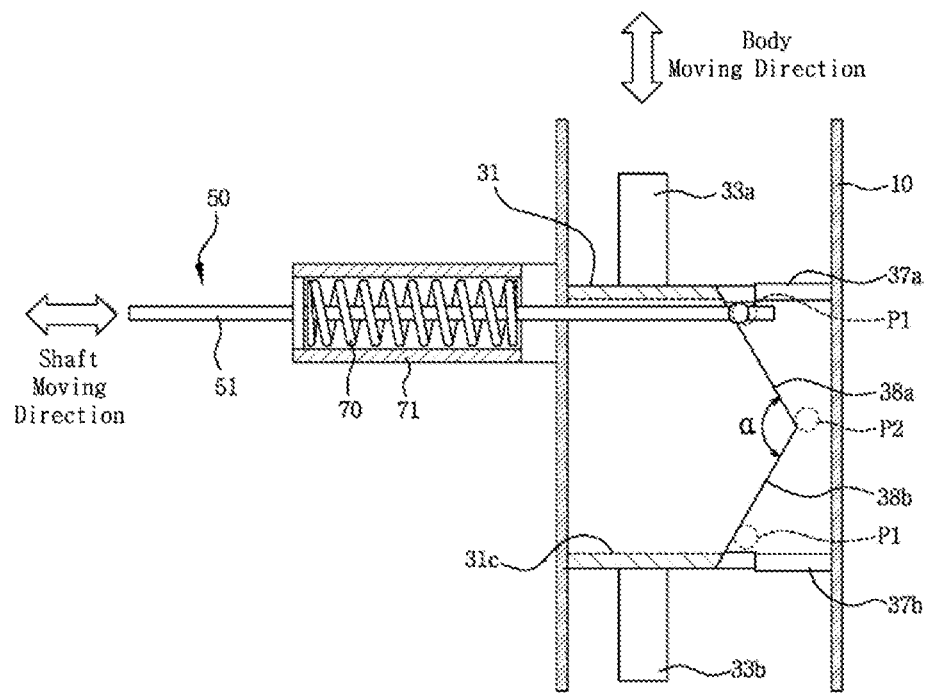
FIG. 7 is a schematic view illustrating a state in which a force is applied to a movable unit of the force transfer mechanism shown in FIG. 6.

Now, a force transfer mechanism in the second embodiment of this invention will be described with reference to FIGS. 6 and 7. Since most elements of the force transfer mechanism in the second embodiment are the same as in the first embodiment, the repetition of the same discussed above and indicated by the same reference numbers will be avoided.

Compared to the above-discussed first embodiment, characterized elements in the second embodiment are a slope direction of a pair of inclined surfaces 38a and 38b and a pair of stoppers 37a and 37b for restricting a compulsory vertical movement of the slider 53 caused by the movement of a body.

The inclined surfaces 38a and 38b in the second embodiment have the reverse slope direction in comparison with the inclined surfaces 32a and 32b in the first embodiment. Specifically, the inclined surfaces 32a and 32b in the first embodiment form V-shaped concavity, whereas the inclined surfaces 38a and 38b in the second embodiment form reverse V-shaped convexity. As is the case in the first embodiment, an angle ($\alpha$) between the inclined surfaces 38a and 38b is preferably set to the range of 30 to 160 degrees.

Since the inclined surfaces 38a and 38b form convexity, the slider 53 may come away from both ends of the movable body 31. In order to prevent this, the stoppers 37a and 37b are formed at both sides from the slider 53.

The stoppers 37a and 37b performs a role of restricting a movement of the slider 53 while keeping slidable contact with the inner sides of the guide housing 10. Therefore, the stoppers 37a and 37b allow a reciprocating sliding of the movable body 31 along the guide housing 10.

The operation of the force transfer mechanism in the second embodiment of this invention is as follows. As shown in FIG. 6, when no force is applied to the handles 33a and 33b, the slider 53 is located at the lowest, i.e., the initial position (P1), of one of the inclined surfaces 38a and 38b.

If a pushing or pulling force is externally applied to the movable body 31 through the handles 33a and 33b, the center of the movable body 31 placed biasedly in the housing 10 moves toward the shaft 51. Therefore, as shown in FIG. 7, the slider 53 forcibly and vertically moves up to the peak position (P2) by a movement of the movable body 31, and also the shaft 51 moves in the same direction.

In this state, if an external force applied to the movable body 31 is removed, the movable body 31 returns to the original position by an elastic force of the elastic member 70. Interlocking with this, the slider 53 located at the peak position (P2) moves in a direction perpendicular to a moving direction of the movable body 31 by a movement of the inclined surface 38a and hence returns to the initial position (P1) as shown in FIG. 6. Similarly, the shaft 51 returns to the corresponding position.

In the second embodiment as well as in the first embodiment, the movable body 31 performs a linear reciprocating motion by means of a pushing or pulling force applied thereto, and the shaft 51 interlocking with the movable body 31 also performs a linear reciprocating motion in a direction perpendicular to a moving direction of the movable body 31. Accordingly, the direction of force can be converted at a right angle.

Now, a force transfer mechanism in the third embodiment of this invention will be described with reference to FIGS. 8 and 9. Since most elements of the force transfer mechanism in the third embodiment are the same as in the first embodiment, the repetition of the same discussed above and indicated by the same reference numbers will be avoided.

Figure 8:
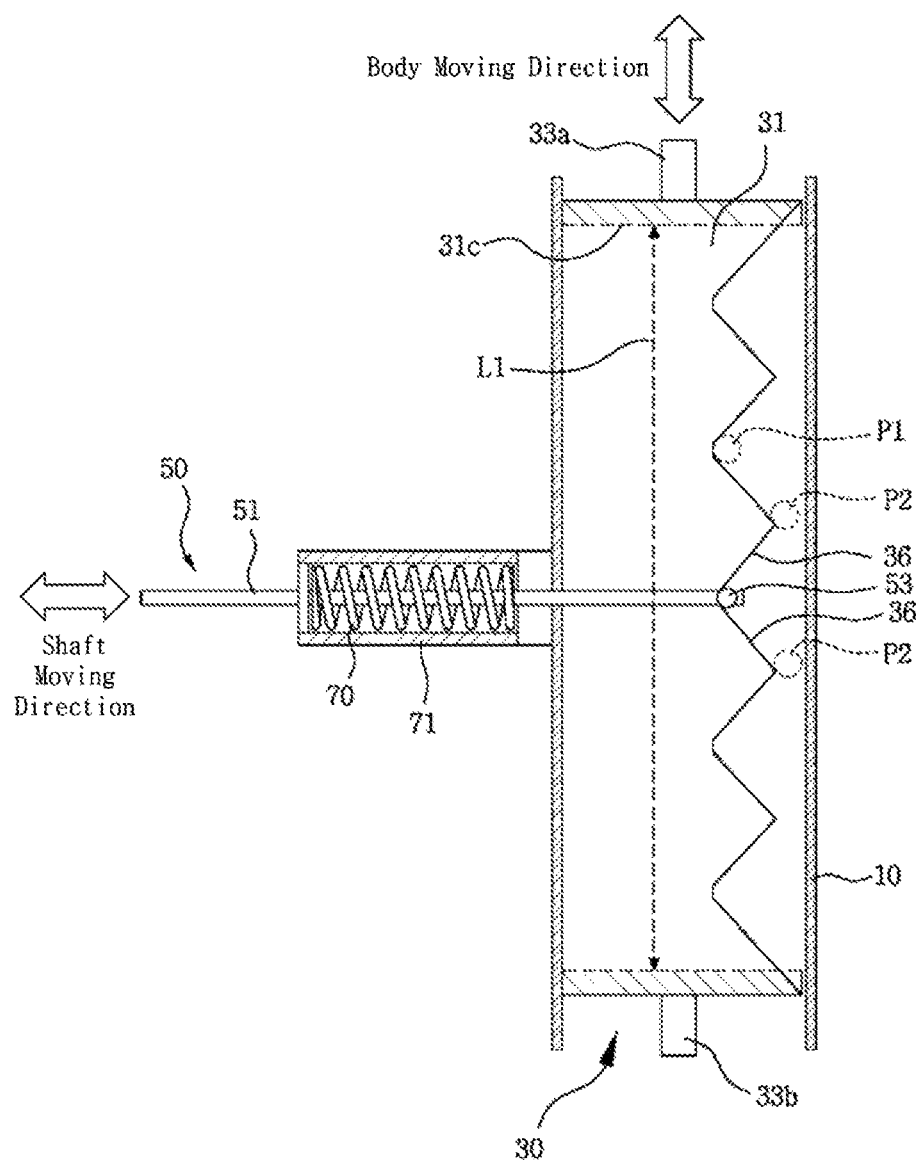
FIGS. 8 and 9 are schematic views illustrating a force transfer mechanism in accordance with the third embodiment of the present invention.

Referring to FIG. 8, the force transfer mechanism in the third embodiment includes inclined surfaces 32a and 32b which are formed continuously on the movable body 31 and have the same slope angle. The length (L1) of the through-hole 31c is in proportion to a distance of the inclined surfaces 36 on the movable body 31.

On one hand, in case of the first and second embodiments, only a single pair of inclined surfaces 32a and 32b or 38a and 38b require repeated push or pull operations in order to transmit or convert a force from the movable body 31 to the shaft 53.

On the other hand, since the movable body 31 in the third embodiment has a plurality of inclined surfaces 36, only a single push or pull of the movable body 31 can achieve a similar effect to several pushing or pulling actions in the first and second embodiments.

Figure 9:
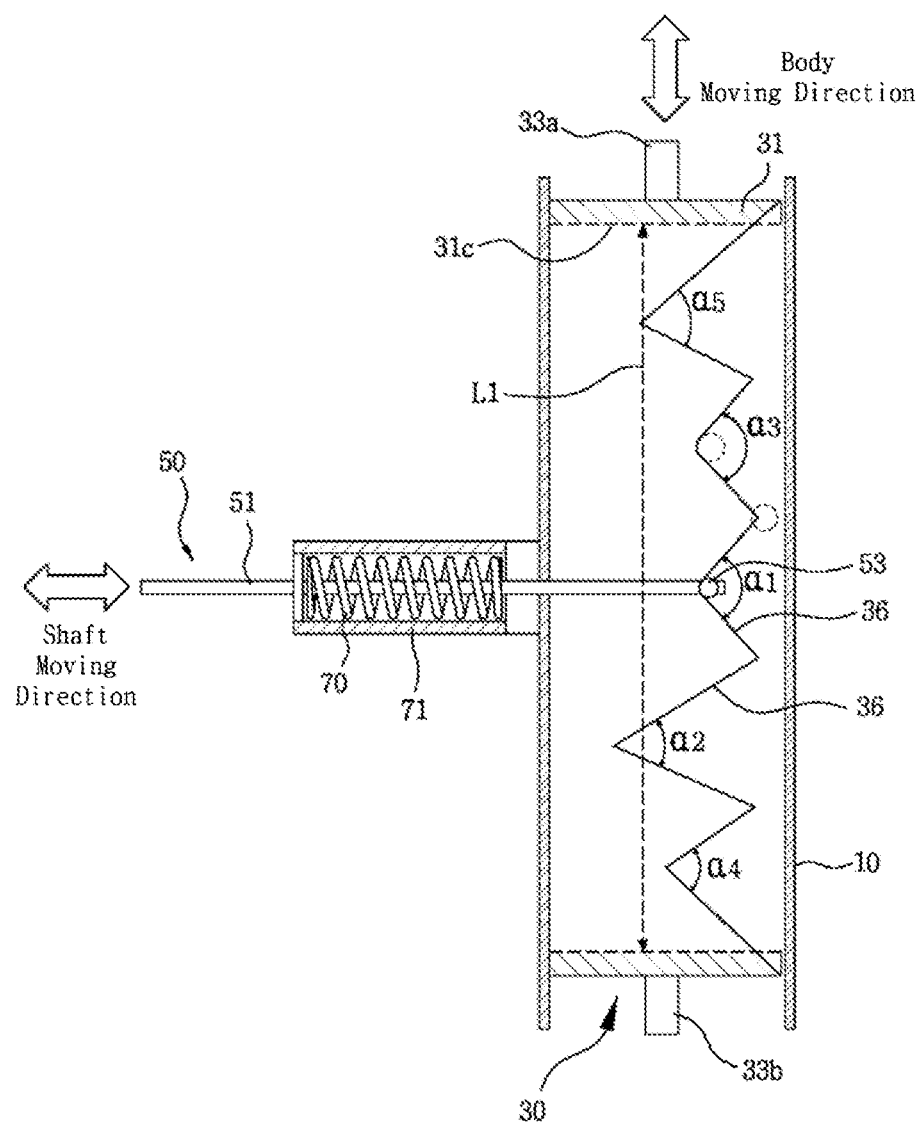

Additionally, referring to FIG. 9, confronting inclined surfaces 36 may have different angles ($\alpha1$~$\alpha5$) and different lengths. In this case, a single force transfer mechanism allows different controls of displacement for a linear reciprocating motion of the shaft 51.

Figure 10:
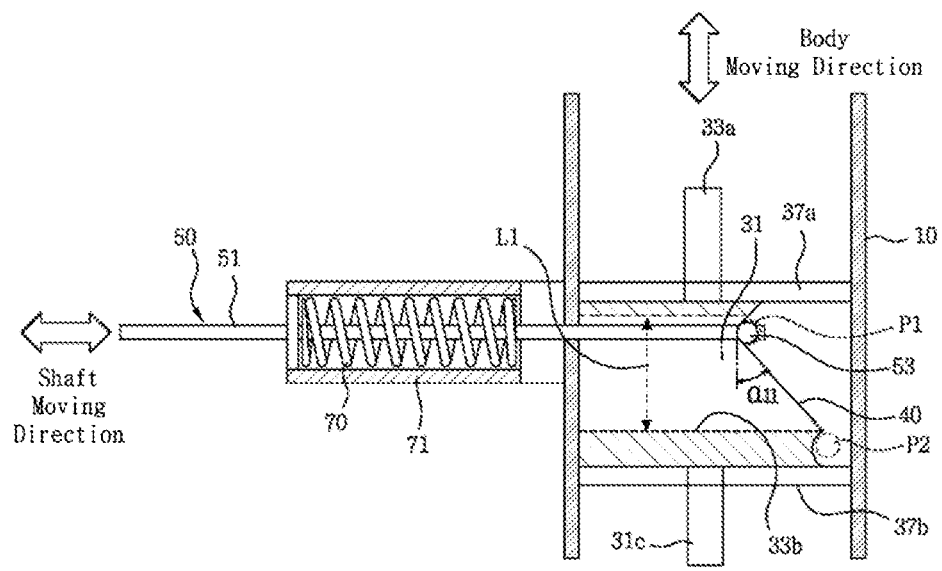
FIG. 10 is a schematic view illustrating a force transfer mechanism in accordance with the fourth embodiment of the present invention.

Now, a force transfer mechanism in the fourth embodiment of this invention will be described with reference to FIG. 10. Since most elements of the force transfer mechanism in the fourth embodiment are the same as in the first embodiment, the repetition of the same discussed above and indicated by the same reference numbers will be avoided.

Unlike the first embodiment, the movable body 31 in the fourth embodiment has a single inclined surface 40. In this case, the initial position (P1) of the slider 53 is located at the lower end of the single inclined surface 40, and the peak position (P2) is located at the upper end of the single inclined surface 40.

Preferably, an angle ($\alpha11$) of the single inclined surface 40 is set to the range of 15 to 75 degrees.

The force transfer mechanism in the fourth embodiment not only performs the same function as the force transfer mechanism in the first embodiment, but also realizes a more compact size due to the single inclined surface 40.

Figure 11:
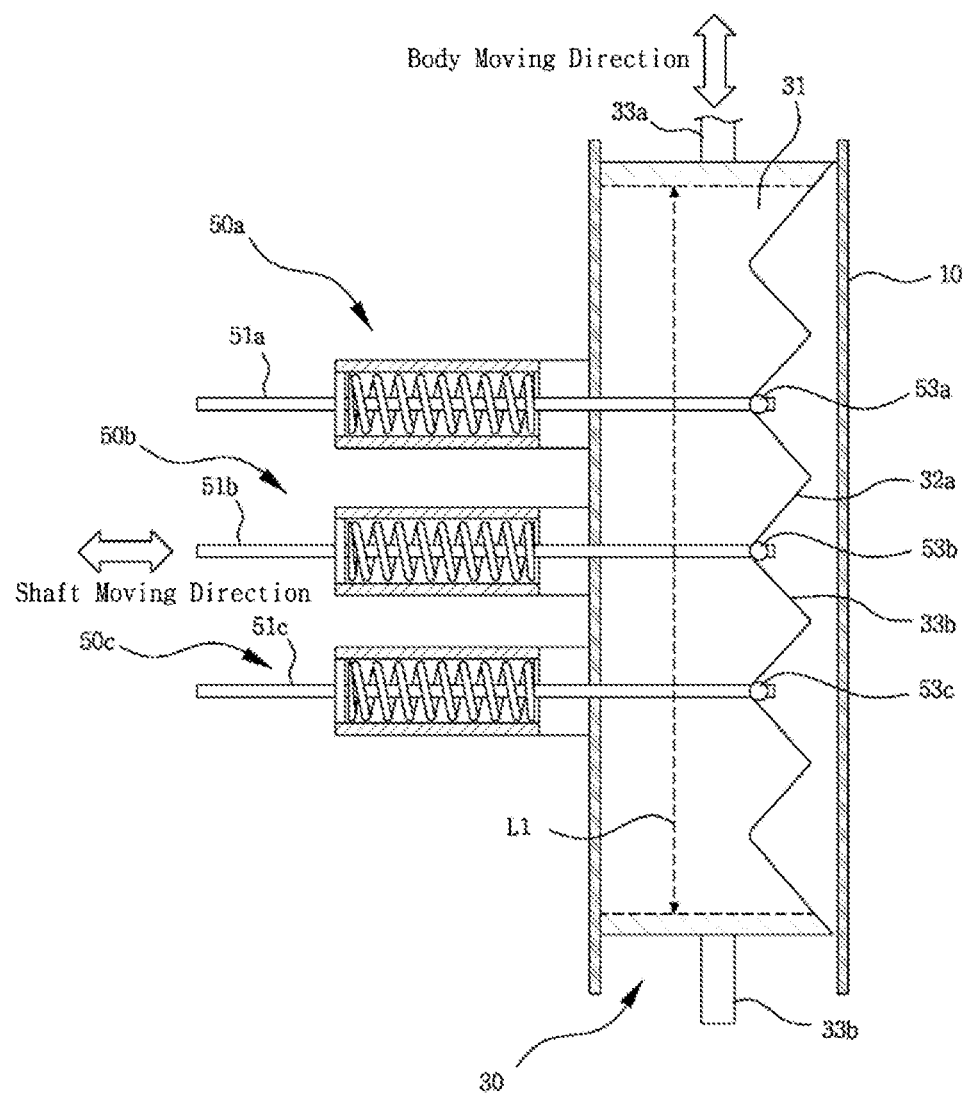
FIG. 11 is a schematic view illustrating a force transfer mechanism in accordance with the fifth embodiment of the present invention.

FIG. 11 is a schematic view illustrating a force transfer mechanism in accordance with the fifth embodiment of the present invention.

Referring to FIG. 11, compared to the above-discussed third embodiment, the force transfer mechanism in the fifth embodiment has a plurality of slave units 50a to 50c.

As a result, the force transfer mechanism in the fifth embodiment has inclined surfaces 32a and 32b which are formed continuously on the movable body 31 and have the same or different slope angles. The length (L1) of the through-hole 31c is in proportion to a distance of the inclined surfaces 36 on the movable body 31.

By forming several inclined surfaces 36 on the movable body 31, a single push or pull of the movable body 31 can achieve a similar effect to several pushing or pulling actions. Additionally, several slave units 50a to 50c produce several outputs through several shafts 51a to 51c each of which performs a linear reciprocating motion in a direction perpendicular to that of the movable body 31.

Figure 12:
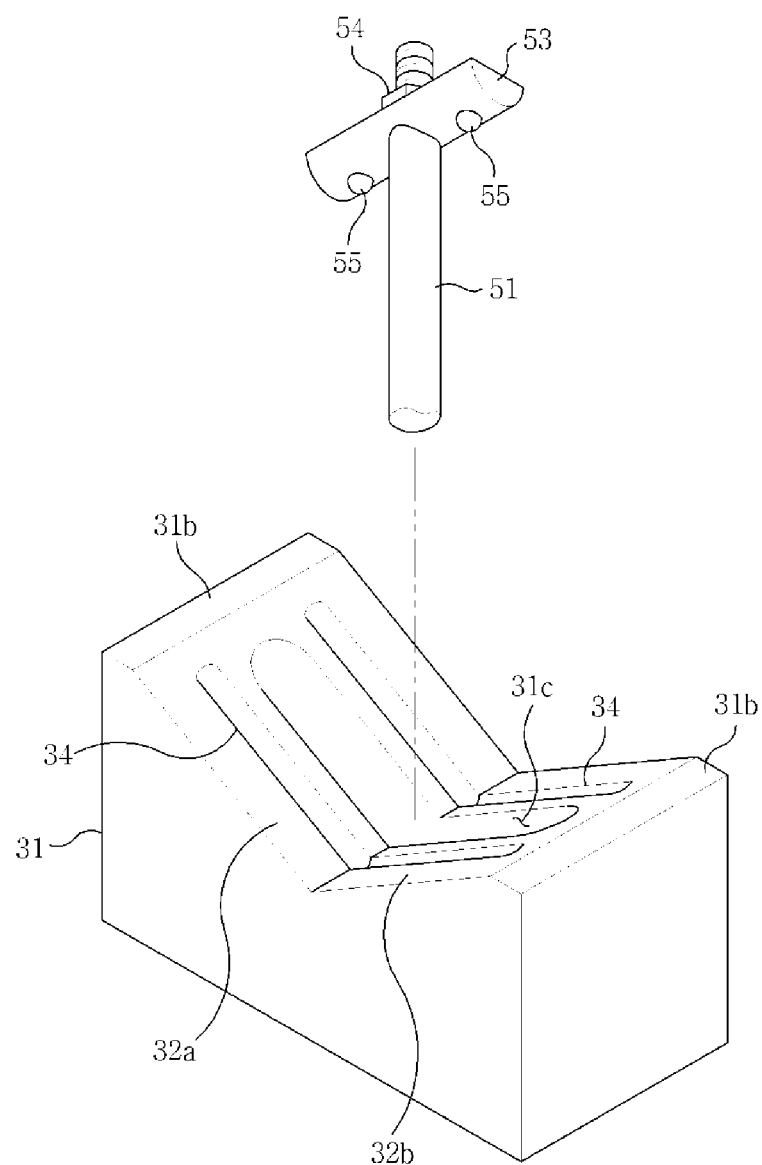
FIG. 12 is a perspective view illustrating a partial structure of a force transfer mechanism in which a slider is joined to a movable body in accordance with the sixth embodiment of the present invention.

Now, a force transfer mechanism in the sixth embodiment of this invention will be described with reference to FIG. 12. FIG. 12 is a perspective view illustrating a partial structure of the force transfer mechanism in which the slider 53 is joined to the movable body 31 in accordance with the sixth embodiment of the present invention.

Since most elements of the force transfer mechanism in the sixth embodiment are the same as in the first embodiment, the repetition of the same discussed above and indicated by the same reference numbers will be avoided.

In the sixth embodiment, the movable body 31 has guide grooves 34 formed near both sides of the through-hole 31c along the inclined surfaces 32a and 32b. Additionally, the slider 53 has ball bearings 55 formed on and protruded from the bottom surface thereof. The ball bearings 55 are inserted into and moved along the guide grooves 34 which are formed of inwardly curved surfaces, e.g., having a semi-circled cross section.

Therefore, the force transfer mechanism in the sixth embodiment can allow the slider 53 to be easily moved along the inclined surfaces 32a and 32b of the movable body 31.

Figure 13:
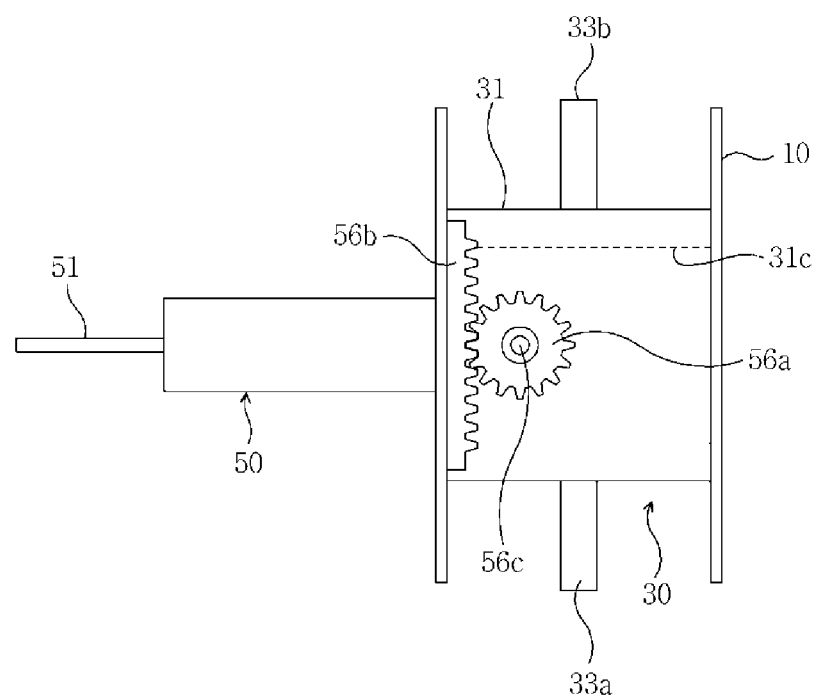
FIG. 13 is a schematic view illustrating a force transfer mechanism in which a movable body is installed in a guide housing by means of a rack and a pinion gear in accordance with the seventh embodiment of the present invention.

Now, a force transfer mechanism in the seventh embodiment of this invention will be described with reference to FIG. 13. FIG. 13 is a schematic view illustrating the force transfer mechanism in which the movable body is installed in the guide housing by means of a rack and a pinion gear in accordance with the seventh embodiment of the present invention.

Since most elements of the force transfer mechanism in the seventh embodiment are the same as in the first embodiment, the repetition of the same discussed above and indicated by the same reference numbers will be avoided.

While the slave unit 50 is driven by a pushing or pulling force applied to the handles 33a and 33b connected to the movable body 31 in the first embodiment, it is possible to drive the slave unit 50 by using a driving member for driving the movable body 31 as shown in the seventh embodiment.

Specifically, the movable body 31 has the pinion 56a installed on at least one side thereof which is adjacent to a direction of the through-hole 31c. Also, the rack 56b engaged with the pinion 56a is installed on the inside of the guide housing 10. The rack 56b has a length equal to or greater than a moving distance of the movable body 31. The pinion 56a is rotatably installed on a pivot 56c of a driving member such as a motor.

Even though no force is applied to the movable body 31 through the handles 33a and 33b, the force transfer mechanism in the seventh embodiment can move the slave unit 50 linked to the movable body 31 by driving the movable body 31 by means of such a driving member.

Although in the seventh embodiment the pinion 56a is formed on the movable body 31 and the rack 56b is formed on the guide housing 10, it is possible to form the rack on the movable body and form the pinion on the guide housing.

Figure 14:
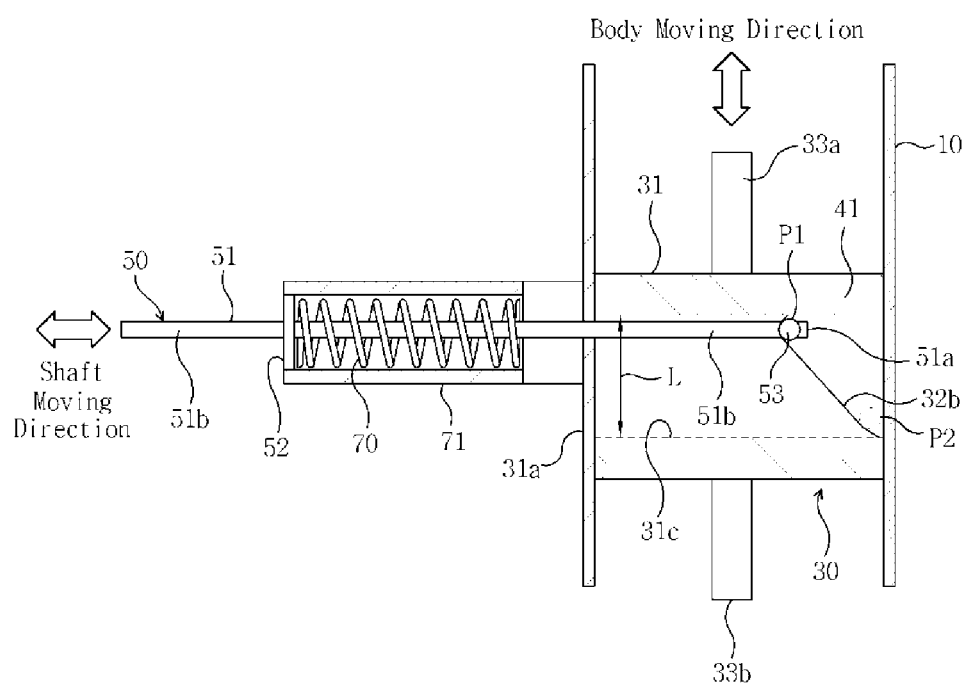
FIG. 14 is a schematic view illustrating a force transfer mechanism in accordance with the eighth embodiment of the present invention.

Now, a force transfer mechanism in the eighth embodiment of this invention will be described with reference to FIG. 14. FIG. 14 is a schematic view illustrating a force transfer mechanism in accordance with the eighth embodiment of the present invention.

Since most elements of the force transfer mechanism in the eighth embodiment are the same as in the first embodiment, the repetition of the same discussed above and indicated by the same reference numbers will be avoided.

Contrary to the first embodiment, the movable body 31 in the eighth embodiment has a single inclined surface 40. In this case, the initial position (P1) of the slider 53 is located at the lower end of the single inclined surface 40, and the peak position (P2) is located at the upper end of the single inclined surface 40. Particularly, the upper end of the single inclined surface 40 has a hollow spot 41 for preventing the slider 53 from overshooting.

Preferably, an angle ($\alpha11$) of the single inclined surface 40 is set to the range of 15 to 75 degrees.

The force transfer mechanism in the eighth embodiment not only performs the same function as the force transfer mechanism in the first embodiment, but also realizes a more compact size due to the single inclined surface 40.

Figure 15:
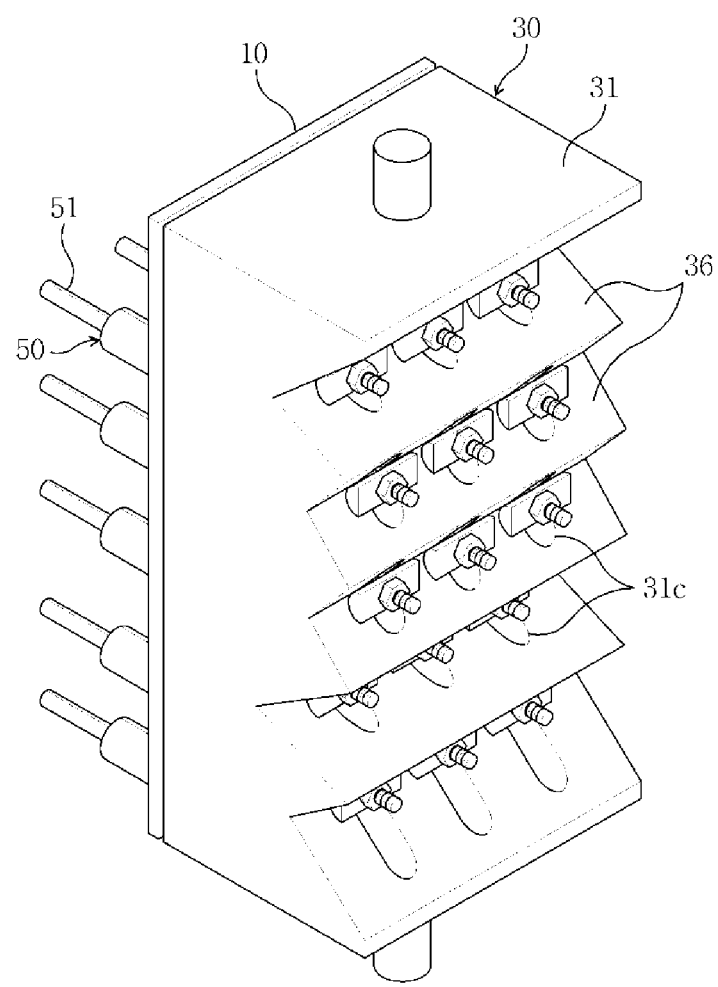
FIG. 15 is a perspective view illustrating a movable body of a force transfer mechanism in accordance with the ninth embodiment of the present invention.

Now, a force transfer mechanism in the ninth embodiment of this invention will be described with reference to FIG. 15. FIG. 15 is a perspective view illustrating a movable body of a force transfer mechanism in accordance with the ninth embodiment of the present invention.

Although the force transfer mechanism has one or more slave units 50 installed in a row to the movable body 31 in the first to eighth embodiments, the force transfer mechanism in the ninth embodiment has a plurality of slave units 50 arranged in a m×n matrix (m and n are natural numbers of 2 or more) to the movable body 30. Also, the movable body 31 has m×n through-holes 31c corresponding to the slave units 50.

The movable body 31 is formed of board-like material and has several inclined surfaces 36 which are formed in a moving direction of the movable body 31. Depending on an angle between confronting inclined surfaces 36, it is possible to control the displacement for a linear reciprocating motion of the shaft 51 of the slave unit 50 which is formed in each through-hole 31c.

Figure 16:
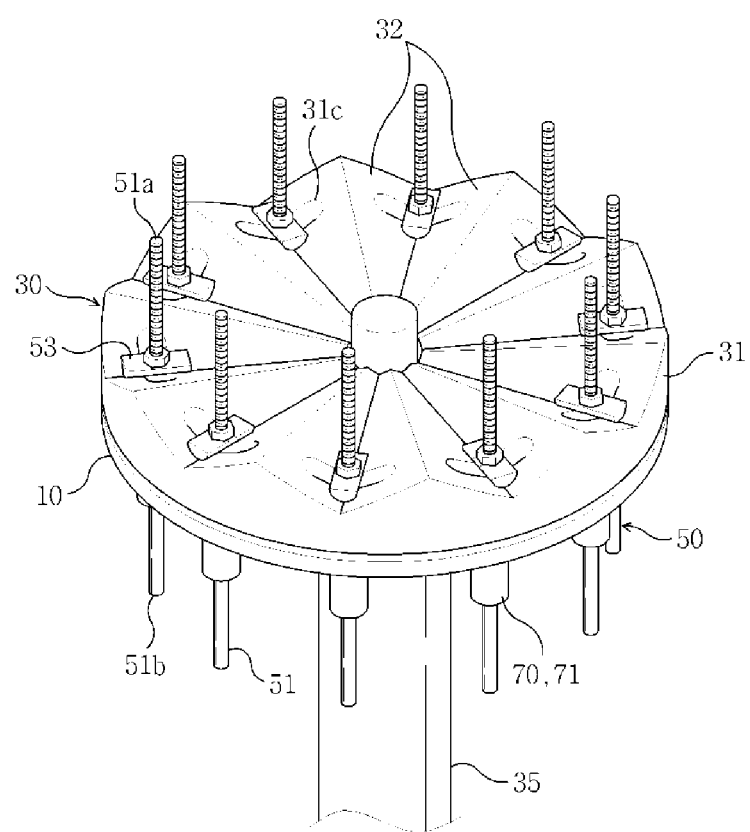
FIG. 16 is a perspective view illustrating a force transfer mechanism in accordance with the tenth embodiment of the present invention.
Figure 17:
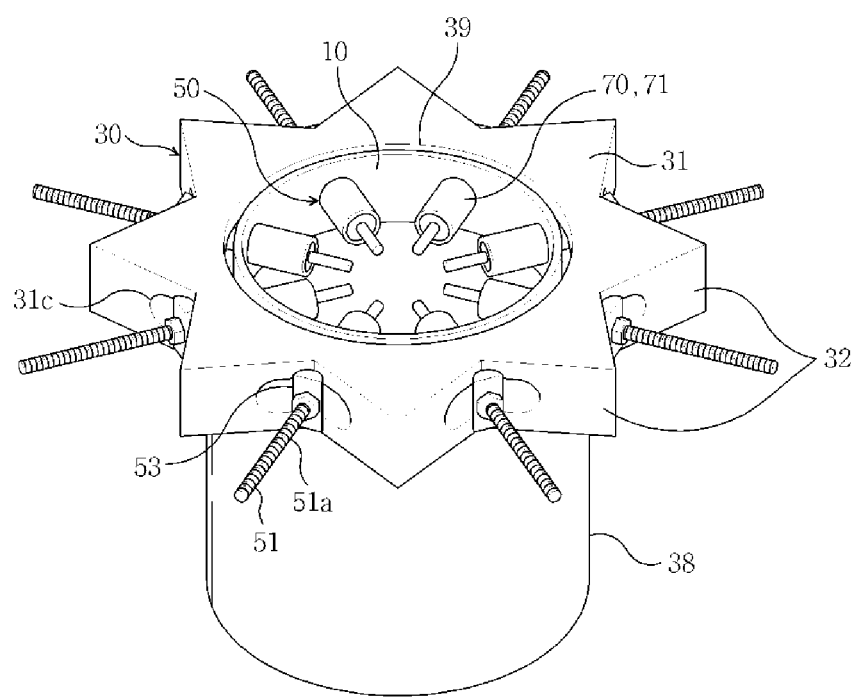
FIG. 17 is a perspective view illustrating a force transfer mechanism in accordance with the eleventh embodiment of the present invention.

Meanwhile, although the force transfer mechanism in the above-discussed first to ninth embodiments has the slave unit 50 installed to the board-like or bar-shaped movable body 31 and converts a linear motion of the movable body 31 into another linear motion of the shaft 51 of the slave unit 50 in a direction perpendicular to a moving direction of the movable body 31, this is exemplary only and not to be considered as a limitation of the present invention. Alternatively, as shown in FIGS. 16 and 17, the movable body 31 may have a disk shape, and the force transfer mechanism may convert a rotary motion of the movable body 31 into a linear motion of the shaft 51 of the slave unit 50.

Now, a force transfer mechanism in the tenth embodiment of this invention will be described with reference to FIG. 16. FIG. 16 is a perspective view illustrating a force transfer mechanism in accordance with the tenth embodiment of the present invention.

The force transfer mechanism in the tenth embodiment includes the movable unit 30, the guide housing 10 and a plurality of the slave units 50. Particularly, the movable body 31 of the movable unit 30 has a circular shape.

The movable unit 30 includes a disk-shaped movable body 31, and a rotation axis 35 fixed to the center of the movable body 31. The movable body 31 is a disk-shaped body which has a lower surface and an upper surface and is centrally fixed to the rotation axis 35. The through-holes 31c are circularly arranged in the movable body 31, penetrating the movable body 31 from the upper surface to the lower surface. The inclined surfaces 32c are radially formed on the upper surface of the movable body 31 around the through-holes 31c.

Although all the through-holes 31c are depicted as being formed at the same distance from the rotation axis 35, this is exemplary only and not to be considered as a limitation. Alternatively, at least one of the through-holes 31c may be formed at unequal distance compared to the others.

The guide housing 10 is equipped to the bottom of the movable body 31. The top of the guide housing 10 may be in contact with or separated from the bottom of the movable body 31.

Each of the slave units 50 moves in a direction perpendicular to a moving direction of the movable unit 30 by interlocking with a rotary reciprocating motion of the movable unit 30. As a result, each slave unit 50 changes the direction of an external force applied to the movable unit 30. The slave units 50 are arranged around the rotation axis 35. The slave unit 50 includes the shaft 51, the slider 53, and the elastic member 70.

The shaft 51 penetrates the guide housing 10 and is disposed in the through-hole 31c of the movable body 31. Then the shaft 51 moves in a direction perpendicular to a rotary reciprocating direction of the movable body 31. The shaft 51 is linked, at one end 51a thereof, to the slider 53 and connected, at the other end 51b thereof, to any structure (not shown) such as a link structure or any apparatus (not shown) that receives mechanical power of the shaft 51. One end 51a of the shaft 51 may be extended from the slider 53.

Additionally, the supporting flange 52 is fixedly formed on the shaft 51 to support one end of the elastic member 70. The supporting flange performs a role of restoring the shaft 51 to the original position by means of elasticity of the elastic member 70.

The slider 53 is a medium that receives a force from the movable body 31 and drives the shaft 51. The slider 53 intersects the through-hole 31c on a boundary between adjacent inclined surfaces 32.

When the movable body 31 moves rotatably by any external force applied to the rotation axis 35, the slider 53 moves in an axis direction of the shaft 51, keeping contact with the inclined surface 32.

The case 71 in which the elastic member 70 is installed is fixed to the bottom of the guide housing 10.

In the tenth embodiment, depending on a rotary motion of the movable body 31 by a driving force of the rotation axis 35, the shaft 51 of the slave unit 50 located in the through-hole 31c moves up and down in a length direction of the rotation axis 35. While the movable body 31 performs a rotary reciprocating motion within a certain angle, i.e., a periodic motion, the shaft 51 of the slave unit 50 fixed to the guide housing 10 moves up and down.

Now, a force transfer mechanism in the eleventh embodiment of this invention will be described with reference to FIG. 17. FIG. 17 is a perspective view illustrating a force transfer mechanism in accordance with the eleventh embodiment of the present invention.

In the eleventh embodiment, the force transfer mechanism includes the movable unit 30, the guide housing 10, and a plurality of the slave units 50. Particularly, the movable body 31 of the movable unit 30 has a circular shape.

The movable unit 30 includes a ring-shaped movable body 31, and a rotor 38 downwardly fixed to the movable body 31. The movable body 31 is a ring-shaped frame which has a central hole 39 for receiving the guide housing 10. The rotor 38 is combined with the movable body 31 at the outside of the central hole 39. The through-holes 31c are laterally formed in the movable body 31 along a rotation direction. The inclined surfaces 32 are formed on the outer lateral side of the movable body 31, thus forming a star-like shape.

The guide housing 10 having a ring-like shape is equipped to the inner lateral side of the movable body 31 in the central hole 39. The guide housing 10 may be in contact with or separated from the inner lateral side of the movable body 31 in the central hole 39.

Each of the slave units 50 moves in a direction perpendicular to a moving direction of the movable unit 30 by interlocking with a rotary reciprocating motion of the movable unit 30. As a result, each slave unit 50 changes the direction of an external force applied to the movable unit 30. The slave units 50 are radially arranged along the circumference of the movable body 31. Each slave unit 50 includes the shaft 51, the slider 53, and the elastic member 70.

The shaft 51 penetrates the guide housing 10 and is disposed in the through-hole 31c of the movable body 31. Then the shaft 51 moves in a direction perpendicular to a rotary reciprocating direction of the movable body 31. The shaft 51 is linked, at one end 51a thereof, to the slider 53. One end 51a of the shaft 51 may be extended from the slider 53.

The case 71 in which the elastic member 70 is installed is fixed to the inner lateral side of the guide housing 10.

The slider 53 is a medium that receives a force from the movable body 31 and drives the shaft 51. The slider 53 intersects the through-hole 31*c* on a boundary between adjacent inclined surfaces 32.

When the movable body 31 moves rotatably by any external force applied to the rotor, the slider 53 moves in the opposite direction compared to a rotation direction, keeping contact with the inclined surface 32.

In the eleventh embodiment, depending on a rotary motion of the movable body 31 by a driving force of the rotor 38, the shaft 51 of the slave unit 50 located in the through-hole 31*c* moves to and fro in a radial direction of the rotor 38. While the movable body 31 performs a rotary reciprocating motion within a certain angle, i.e., a periodic motion, the shaft 51 of the slave unit 50 fixed to the guide housing 10 moves to and fro in a radial direction along the circumference of the movable body 31.

While this invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A force transfer mechanism, comprising:
   a guide housing having inner sides to lead a reciprocating sliding in a through direction of the guide housing;
   a movable body including
      a front side and a rear side facing the front side, the front and rear sides being installed to be in contact with the inner sides of the guide housing to perform the reciprocating sliding in the through direction so as to cause a linear reciprocating motion of the movable body by an externally applied force in the through direction,
      a cutout groove having a plurality of inclined surfaces on the rear side, wherein the plurality of inclined surfaces are formed to be inclined relative to the through direction in the guide housing, and
      a through-hole penetrating the front side and the rear side; and
   a slave unit comprising
      a shaft passing through the movable body entirely and through the guide housing, and
      an elastic member positioned outside the guide housing and coupled to the shaft,
      wherein a first end of the shaft is positioned on the rear side of the movable body by penetrating the through-hole of the movable body and configured to move along the plurality of inclined surfaces of the cutout groove, and a second end of the shaft is positioned at the front side of the movable body so that the shaft is configured to move in a direction perpendicular to the front side of the movable body by interlocking with the linear reciprocating motion of the movable body.

2. The force transfer mechanism of claim 1, wherein the slave unit is configured to
   accumulate an elastic force therein when a force is externally applied to the movable body, and
   move toward a direction in which the elastic force of the slave unit is returned when the force externally applied to the movable body is removed.

3. The force transfer mechanism of claim 1, wherein the through-hole of the movable body has a cross section of an elongated oval form or a rectangular form, a length (L) of the cross section being greater than a width (W) of the cross section, the width (W) of the cross section being greater than a diameter of the shaft, and the length (L) of the cross section being greater than at least twice a displacement of the shaft.

4. The force transfer mechanism of claim 1, wherein the inclined surfaces include a pair of inclined surfaces which meet each other to form a predetermined angle.

5. The force transfer mechanism of claim 4, wherein the pair of inclined surfaces forms
   a V-shaped concavity inwardly concave with respect to the rear side, or
   a reverse V-shaped convexity convex with respect to the rear side.

6. The force transfer mechanism of claim 4, wherein the predetermined angle formed between the pair of inclined surfaces is 30 to 160 degrees.

7. The force transfer mechanism of claim 1, wherein the movable body includes two or more cutout grooves that are continuous to each other on the rear side.

8. The force transfer mechanism of claim 7, wherein angles formed between facing inclined surfaces of the two or more cutout grooves are same.

9. The force transfer mechanism of claim 7, wherein facing inclined surfaces of the two or more cutout grooves have different angles and lengths therebetween.

10. The force transfer mechanism of claim 7, further comprising a plurality of slave units,
    wherein the movable body has a plurality of through-holes, and shafts of the plurality of slave units penetrate the plurality of through-holes, respectively.

11. The force transfer mechanism of claim 1, wherein the shaft is configured to drive a latch of a door lock.

12. The force transfer mechanism of claim 1, further comprising a plurality of slave units,
    wherein the movable body has a plurality of through-holes, and shafts of the plurality of slave units penetrate the plurality of through-holes, respectively.

13. The force transfer mechanism of claim 8, further comprising a plurality of slave units,
    wherein the movable body has a plurality of through-holes, and shafts of the plurality of slave units penetrate the plurality of through-holes, respectively.

14. The force transfer mechanism of claim 9, further comprising a plurality of slave units,
    wherein the movable body has a plurality of through-holes, and shafts of the plurality of slave units penetrate the plurality of through-holes, respectively.

* * * * *